United States Patent
Fox

(10) Patent No.: US 11,286,054 B2
(45) Date of Patent: Mar. 29, 2022

(54) DUAL HYBRID PROPULSION SYSTEM FOR AN AIRCRAFT HAVING A CROSS-CONNECTING CLUTCH

(71) Applicant: The Boeing Company, Chicago, IL (US)

(72) Inventor: Michael Thomas Fox, Saint Charles, MO (US)

(73) Assignee: The Boeing Company, Chicago, IL (US)

(*) Notice: Subject to any disclaimer, the term of this patent is extended or adjusted under 35 U.S.C. 154(b) by 264 days.

(21) Appl. No.: 16/591,040

(22) Filed: Oct. 2, 2019

(65) Prior Publication Data

US 2021/0101692 A1    Apr. 8, 2021

(51) Int. Cl.
*B64D 35/04* (2006.01)
*B60L 53/00* (2019.01)
(Continued)

(52) U.S. Cl.
CPC .............. *B64D 35/04* (2013.01); *B60L 50/66* (2019.02); *B60L 53/00* (2019.02); *B64D 27/04* (2013.01); *B64D 27/10* (2013.01); *B64D 27/24* (2013.01); *B64D 29/00* (2013.01); *B64D 31/06* (2013.01); *B64D 31/10* (2013.01); *B64D 31/14* (2013.01); *B64D 33/02* (2013.01); *B64D 33/04* (2013.01); *B64D 35/08* (2013.01); *B64D 41/00* (2013.01);
(Continued)

(58) Field of Classification Search
CPC .. B64D 2027/026; B64D 35/04; B64D 31/10; B64D 31/14
See application file for complete search history.

(56) References Cited

U.S. PATENT DOCUMENTS

| | | | |
|---|---|---|---|
| 2015/0274306 A1* | 10/2015 | Sheridan | B64D 35/02 60/772 |
| 2015/0284071 A1* | 10/2015 | Veilleux, Jr | B64D 35/08 244/62 |

(Continued)

FOREIGN PATENT DOCUMENTS

| | | |
|---|---|---|
| EP | 2930114 A1 | 10/2015 |
| EP | 3395680 A1 | 10/2018 |
| WO | 2018193522 A1 | 10/2018 |

OTHER PUBLICATIONS

EP, Extended Search Report, Application No. 20191563.4-1010, dated Feb. 9, 2021.

*Primary Examiner* — Philip J Bonzell
*Assistant Examiner* — Tye William Abell
(74) *Attorney, Agent, or Firm* — Vivacqua Crane PLLC

(57) ABSTRACT

A propulsion system for an aircraft is disclosed, and includes a first propeller, a second propeller, a first hybrid propulsion system, a second hybrid propulsion system, and a cross-connecting clutch. The first hybrid propulsion system includes a first motor coupled to a first engine by a first overrunning clutch, where the first hybrid propulsion system is operably coupled to drive the first propeller. The second hybrid propulsion system includes a second motor coupled to a second engine by a second overrunning clutch, where the second hybrid propulsion system is operably coupled to drive the second propeller. The cross-connecting clutch is operably coupled to both the first hybrid propulsion system and the second hybrid propulsion system and configured to actuate into an engaged position.

20 Claims, 5 Drawing Sheets

(51) Int. Cl.
  *B60L 50/60*   (2019.01)
  *B64D 27/04*   (2006.01)
  *B64D 27/10*   (2006.01)
  *B64D 27/24*   (2006.01)
  *B64D 29/00*   (2006.01)
  *B64D 31/10*   (2006.01)
  *B64D 31/14*   (2006.01)
  *B64D 33/02*   (2006.01)
  *B64D 33/04*   (2006.01)
  *B64D 41/00*   (2006.01)
  *B64D 31/06*   (2006.01)
  *B64D 35/08*   (2006.01)
  *B64D 27/02*   (2006.01)

(52) U.S. Cl.
  CPC ....... *B60L 2200/10* (2013.01); *B60L 2210/44* (2013.01); *B64D 2027/026* (2013.01); *B64D 2033/024* (2013.01)

(56) References Cited

U.S. PATENT DOCUMENTS

2017/0297679 A1*  10/2017  Elliott .................... F16D 48/06
2017/0327238 A1*  11/2017  Roever .................. B64D 29/00
2018/0251228 A1*   9/2018  Sands .................... B64D 31/00
2019/0002117 A1*   1/2019  Gansler ................. F01D 15/10
2019/0135427 A1*   5/2019  Robertson ............. B64D 27/24
2019/0322366 A1*  10/2019  Gaffney ................. B64C 3/16
2021/0139154 A1*   5/2021  Klonowski ............ B64D 35/02

\* cited by examiner

DUAL HYBRID PROPULSION SYSTEM FOR AN AIRCRAFT HAVING A CROSS-CONNECTING CLUTCH

INTRODUCTION

The present disclosure relates to a propulsion system for an aircraft. More particularly, the present disclosure is directed towards an aircraft propulsion system having a first hybrid propulsion system operably coupled to a first propeller, a second hybrid propulsion system operably coupled to a second propeller, and a cross-connecting clutch.

BACKGROUND

A commuter aircraft is typically smaller in size, carries a limited number of passengers, and may be used to travel relatively short distances. A commuter aircraft may either be propeller-driven or, alternatively, driven by gas turbines, which are also referred to as jet engines. In general, propeller-driven aircraft are usually employed when flying shorter distances while gas turbines are employed for longer distances. For example, a propeller-driven aircraft may be used to transport super-commuters between their place of residence and their work. Some super-commuters may live in a different geographic region than their workplace, while other super-commuters live outside or on the outskirts of a major metropolitan area where their workplace is located. Thus, a propeller-driven aircraft may be used frequently to transport commuters back and forth between their residence and work.

SUMMARY

According to several aspects, a propulsion system for an aircraft is disclosed. The propulsion system comprises a first propeller and a second propeller. The propulsion system also includes a first hybrid propulsion system including a first motor coupled to a first engine by a first overrunning clutch, where the first hybrid propulsion system is operably coupled to drive the first propeller. The propulsion system also includes a second hybrid propulsion system including a second motor coupled to a second engine by a second overrunning clutch, where the second hybrid propulsion system is operably coupled to drive the second propeller. The propulsion system also includes a cross-connecting clutch operably coupled to both the first hybrid propulsion system and the second hybrid propulsion system and configured to actuate into an engaged position.

In another aspect, a method of operating a propulsion system for an aircraft is disclosed. The method includes monitoring, by a control module, operation of a first engine and a second engine. The first engine is part of a first hybrid propulsion system that is operably coupled to a first propeller and the second engine is part of a second hybrid propulsion system operably coupled to a second propeller. The method includes determining, by the control module, either the first engine or the second engine is not outputting a required amount of torque to maintain a desired phase of flight. The first hybrid propulsion system includes a first motor coupled to the first engine by a first overrunning clutch and the second hybrid propulsion system includes a second motor coupled to the second engine by a second overrunning clutch. In response to determining either the first engine or the second engine is not outputting the required torque, the method includes instructing a cross-connecting clutch to actuate from a disengaged position into an engaged position.

In yet another aspect, an aircraft is disclosed. The aircraft includes a nacelle, a first propeller, and a second propeller, where the first propeller and the second propeller are attached to and located on opposing sides of the nacelle. The aircraft also includes a first hybrid propulsion system including a first motor coupled to a first engine by a first overrunning clutch, where the first hybrid propulsion system is operably coupled to drive the first propeller. The aircraft also includes a second hybrid propulsion system including a second motor coupled to a second engine by a second overrunning clutch, where the second hybrid propulsion system is operably coupled to drive the second propeller. The aircraft also includes a cross-connecting clutch operably coupled to both the first hybrid propulsion system and the second hybrid propulsion system and configured to actuate into an engaged position. Engaging the cross-connecting clutch results in the first hybrid propulsion system driving the second propeller when the second engine does not output a required torque to maintain a desired phase of flight of the aircraft, and engaging the cross-connecting clutch results in the second hybrid propulsion system driving the first propeller when the first engine does not output the required torque to maintain the desired phase of flight of the aircraft.

The features, functions, and advantages that have been discussed may be achieved independently in various embodiments or may be combined in other embodiments further details of which can be seen with reference to the following description and drawings.

BRIEF DESCRIPTION OF THE DRAWINGS

The drawings described herein are for illustration purposes only and are not intended to limit the scope of the present disclosure in any way.

DETAILED DESCRIPTION

The present disclosure is directed towards a propulsion system for a propeller-driven aircraft. The aircraft includes a first hybrid propulsion system that is operably coupled to and drives a first propeller. The aircraft also includes a second hybrid propulsion system that is operably coupled to and drives a second propeller. The aircraft also includes a cross-connecting clutch that is operably coupled to both the first hybrid propulsion system and the second hybrid propulsion system. The first hybrid propulsion system drives both the first propeller and the second propeller when the cross-connecting clutch is in the engaged position. Similarly, the second hybrid propulsion system drives both the first propeller and the second propeller when the clutch is in the engaged position. Accordingly, in the event one of the two hybrid propulsion systems become inoperable, both propellers may still be driven.

Additionally, each hybrid system includes an engine, a motor, and an overrunning clutch that operably couples the engine to the motor. The overrunning clutch is configured to engage when the torque produced by the engine exceeds the torque produced by the motor such as, for example, when the engine is initially started. Moreover, the engine of each hybrid propulsion system is sized to accommodate the power requirements of the aircraft during the cruise phase of flight. For phases of flight other than cruise, such as during the climb phase of flight, the motor may be utilized to augment the torque produced by the engine such that the torque supplied to the propeller is a sum of the torque provided by the engine and the motor. In contrast, conventional systems may have engines that are sized to accommodate the climb phase of flight.

The following description is merely exemplary in nature and is not intended to limit the present disclosure, application, or uses.

Figure 1:
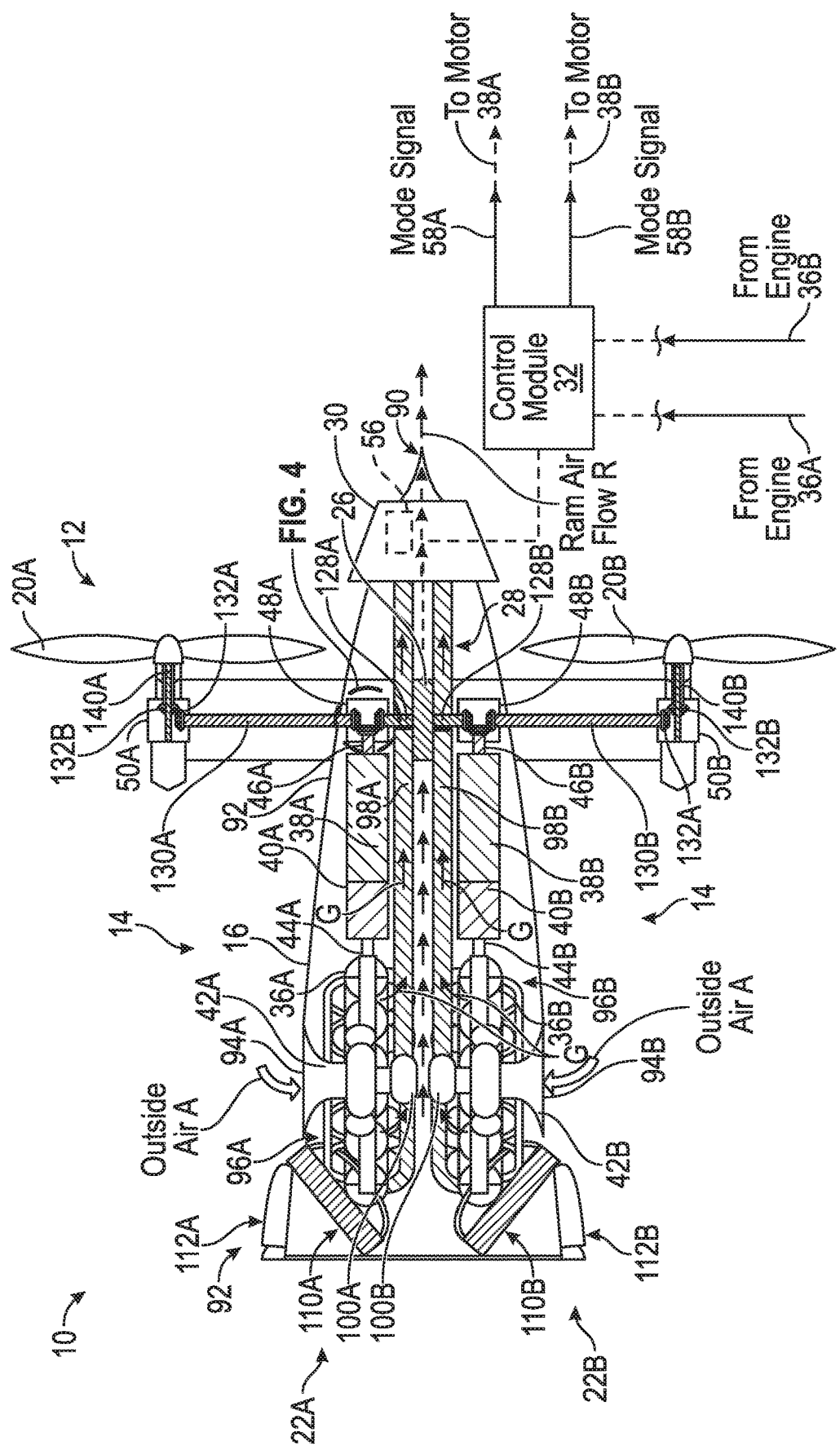
FIG. 1 is a cross-sectioned side view of a propulsion system for an aircraft, where the propulsion system includes a first hybrid propulsion system, a second hybrid propulsion system, and a cross-connecting clutch, according to an exemplary embodiment.

Referring to FIG. 1, a propulsion system 10 for an aircraft 12 is shown. The aircraft 12 is a propeller-driven aircraft, and therefore includes a first propeller 20A and a second propeller 20B that are attached to and located on opposing sides 14 of a nacelle 16. The propulsion system 10 includes a first hybrid propulsion system 22A, a second hybrid propulsion system 22B, a cross-connecting clutch 26, an exhaust system 28, a tail cone fan 30, and a control module 32 in electronic communication with the cross-connecting clutch 26. The first hybrid propulsion system 22A, the second hybrid propulsion system 22B, the cross-connecting clutch 26, and the exhaust system 28 are all located within the nacelle 16 of the aircraft 12. The first hybrid propulsion system 22A is operably coupled to and drives the first propeller 20A. Similarly, the second hybrid propulsion system 22B is operably coupled to and drives the second propeller 20B.

The first hybrid propulsion system 22A includes a first engine 36A, a first motor 38A, a first overrunning clutch 40A, and a first turbocharger 42A. The first overrunning clutch 40A couples the first engine 36A and the first motor 38A to one another when engaged and decouples the first engine 36A from the first motor 38A when disengaged. When the first overrunning clutch 40A is engaged, the first engine 36A and the first motor 38A are part of a torque summing arrangement. The first overrunning clutch 40A and the second overrunning clutch 40B are one-way overrunning clutches such as sprag clutches.

The first overrunning clutch 40A is connected to an output 44A of the first engine 36A and an input (not shown) of the first motor 38A. An output 46A of the first motor 38A is connected to a first final drive gearbox 48A. Similarly, the second hybrid propulsion system 22B includes a second engine 36B, a second motor 38B, a second overrunning clutch 40B, and a second turbocharger 42B. The second overrunning clutch 40B is connected to an output 44B of the second engine 36B and an input (not shown) of the second motor 38B. An output 46B of the second motor 38B is connected to a second final drive gearbox 48B.

In the non-limiting embodiment as shown in FIG. 1, the first engine 36A and the second engine 36B are illustrated as turbocharged six-cylinder inline diesel engines. In one specific embodiment, the engines 36A and 36B are compression ignition (i.e., diesel) four-stroke engines, as a compression ignition engine is more efficient than a spark ignition engine. However, it is to be appreciated that the engines 36A, 36B are not limited to compression ignition engines. In an alternative embodiment, the engines 36A, 36B are spark ignition engines. Furthermore, although four-stroke engines are mentioned, a two-stroke engine may also be used. Two-stroke engines tend to have lower maintenance costs, as a two-stroke engine has a more simplified valve train when compared to a four-stroke engine. The first motor 38A and the second motor 38B are both electric motors such as, but not limited to, permanent magnet direct current (DC) motors.

Sometimes either the first hybrid propulsion system 22A or the second hybrid propulsion system 22B are unable to transmit sufficient power to the respective propeller 20A, 20B to maintain the aircraft 12 in the desired phase of flight. Specifically, the control module 32 is in electronic communication with both the first engine 36A and the second engine 36B, and monitors operation of the first engine 36A and the second engine 36B in real-time. The control module 32 may refer to, or be part of an electronic circuit, a combinational logic circuit, a field programmable gate array (FPGA), a processor (shared, dedicated, or group) that executes instructions, code, or a combination of some or all of the above, such as in a system-on-chip.

In operation, the control module 32 determines when either the first engine 36A or the second engine 36B is not outputting a required amount of torque. For example, the first engine 36A or the second engine 36B may become non-operational due to a loss in oil pressure. In response to determining either the first engine 36A or the second engine 36B is not outputting the required amount of torque, the control module 32 instructs the cross-connecting clutch 26 to actuate from a disengaged position into the engaged position. The first hybrid propulsion system 22A is operably coupled to both the first propeller 20A and the second propeller 20B when the cross-connecting clutch 26 is engaged. Therefore, the first hybrid propulsion system 22A drives both propellers 20A, 20B when the cross-connecting clutch 26 is engaged. Likewise, the second hybrid propulsion system 22B is operably coupled to drive both the first propeller 20A and the second propeller 20B when the cross-connecting clutch 26 is engaged. In one exemplary embodiment, the cross-connecting clutch 26 is a disk clutch that is coupled to the first propeller 20A and the second propeller 20B by respective gearboxes 48A, 48B, 50A, 50B, and is described in greater detail below.

Operation of the overrunning clutches 40A and 40B are now described. The first overrunning clutch 40A and the second overrunning clutch 40B engage based on a difference between the torque produced by the respective engine 36A, 36B and motor 38A, 38B. Specifically, the first overrunning clutch 40A is engaged when an engine torque of the first engine 36A is greater than a motor torque of the first motor 38A. For example, the engine torque of the first engine 36A is greater than the motor torque of the first motor 38A when the first engine 36A is turned on. Thus, the first overrunning clutch 40A remains engaged when the aircraft 12 operates in a climb phase of flight. Similarly, the second overrunning clutch 40A is engaged when the engine torque of the second engine 36B is greater than the motor torque of the second motor 38B, such as when the second engine 36A is turned on, or when the aircraft 12 is in the climb phase of flight. The first overrunning clutch 40A and the second overrunning clutch 40B are both configured to disengage when the engine torque is zero, or substantially zero, such as when the rotational speed of the engine output 44A, 44B is less than a rotational speed of a shaft of the respective motor 38A, 38B such as when the first and second engines 36A or 36B are turned off.

The control module 32 is in electronic communication with both motors 38A, 38B. The control module 32 sends a mode signal 58A, 58B to the respective motors 38A, 38B, which instructs the motors 38A, 38B to operate in either a power mode or a regeneration mode. The control module 32 instructs the motors 38A, 38B to operate in either the power mode or the regeneration mode based on the phase of flight of the aircraft 12, which, in one example may be inferred by the throttle position of the engines 36A, 36B, the angle of the stabilizer, and the like. For example, a thirty percent throttle position would be considered the cruise phase of flight, while eighty percent throttle would be considered the takeoff or climb phase of flight. For example, when the control module 32 determines that the operator desires to operate the aircraft 12 in the climb phase of flight, based on the throttle position, the control module 32 transmits respective mode signals 58A, 58B to the motors 38A and 38B to shift from a regeneration mode to the power mode. In the power mode, the torque produced by the motors 38A, 38B are summed with the torque produced by the respective engines 36A, 36B to drive the respective propellers 20A, 20B.

The motors 38A, 38B operate in the power mode when the aircraft 12 requires excess thrust or power, such as when the aircraft 12 operates in a climb phase of flight. When excess thrust or power is not required, the control module 32 transmits sends the mode signal 58A, 58B to the motors 38A and/or 38B to shift from the power mode to the regeneration mode. In the regeneration mode, the motors 38A, 38B function as generators to charge the battery packs 72A, 72B. Moreover, the torque produced solely by the respective engines 36A, 36B is used to drive the respective propellers 20A, 20B. Accordingly, the first motor 38A and the second motor 38B operate in the power mode when commanded by the control module 32, such as when the control module 32 determines that the aircraft 12 is operating in the climb phase of flight. The first motor 38A and the second motor 38B operate in the regeneration mode when commanded by the control module 32, such as when the control module 32 determines that the aircraft 12 is being commanded to operate in the cruise phase of flight.

In an exemplary embodiment, the control module 32 may determine that the pilot has commanded a change in the phase of flight. For example, the pilot may command a change in the phase of flight by repositioning the throttle lever and/or moving a stabilizer (not shown) of the aircraft 12. In response to determining a change in the phase of flight, the control module 32 determines the current torque being output by engines 36A and/or 36B is not the required amount of torque to maintain the current phase of flight, or to achieve the newly requested phase of flight. In another embodiment, the control module 32 may determine that either first engine 36A or the second engine 36B is non-operational and thus the aircraft 12 is unable to maintain the current phase of flight.

It is to be appreciated that the engines 36A, 36B receive assistance from the motors 38A, 38B when the motors 38A, 38B operate in the power mode. Accordingly, the engines 36A, 36B are not sized based on the power requirements of the propellers 20A, 20B during the climb phase of flight. Instead, the engines 36A, 36B are sized to accommodate the power requirements of the propellers 20A, 20B during the cruise phase of flight. Since the cruise phase of flight requires less power when compared to the climb phase of flight, the engines 36A, 36B are smaller and weigh less when compared to conventional engines that are sized to accommodate the power requirements during the climb phase of flight.

Figure 2:
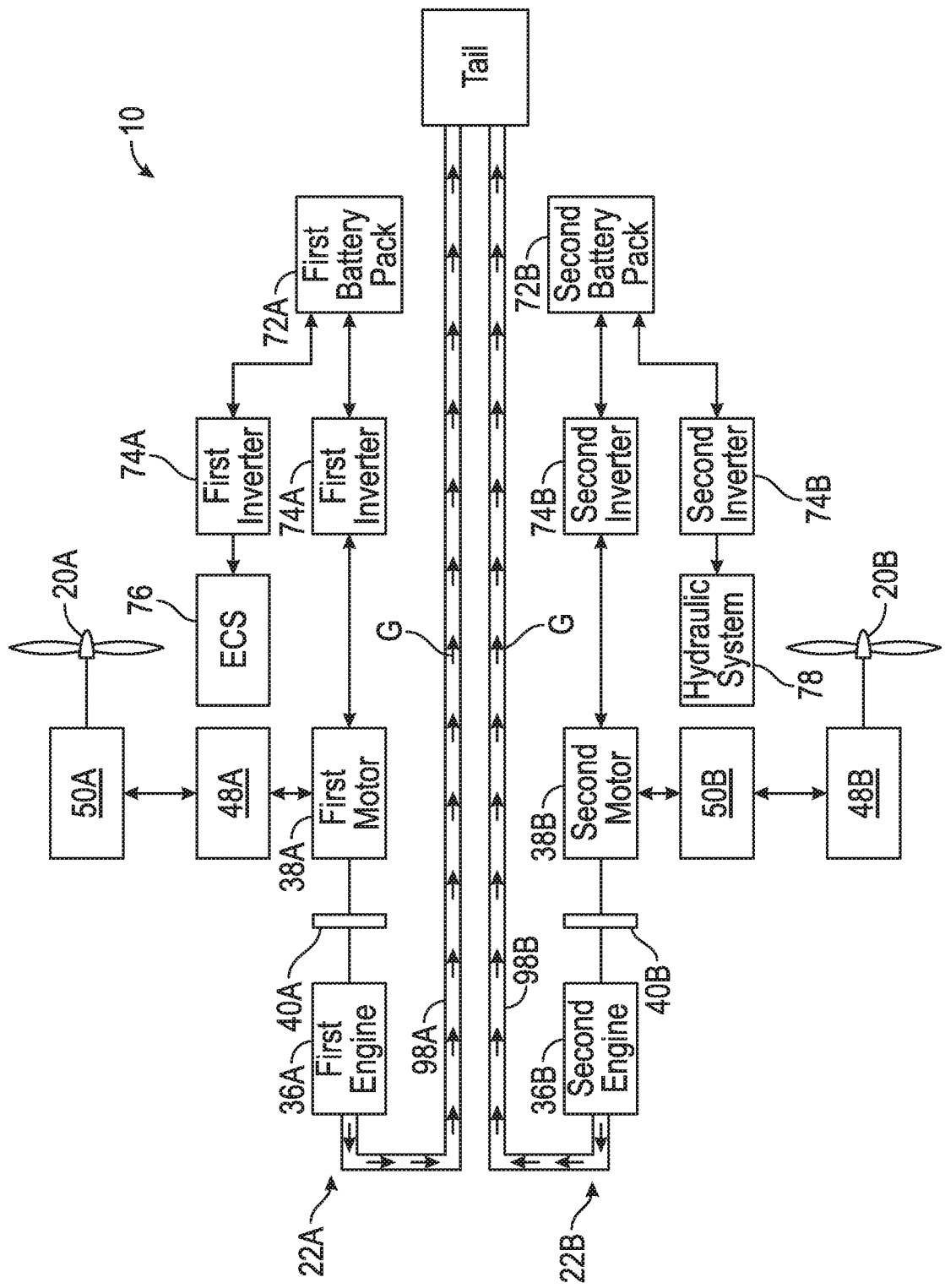
FIG. 2 is a schematic diagram of the propulsion system shown in FIG. 1, according to an exemplary embodiment.

FIG. 2 is a schematic diagram of the propulsion system 10. As seen in FIG. 2, the first hybrid propulsion system 22A and the second hybrid propulsion system 22B are arranged in a parallel configuration. Therefore, the first engine 36A and the first motor 38A provide power to the first propeller 20A through torque summing when the first motor 38A is operating in the power mode. Similarly, the second engine 36B and the second motor 38B provide power to the second propeller 20B through torque summing when the second motor 38B is operating in the power mode. It is to be appreciated that the parallel configuration shown in FIG. 2 results in improved power transfer efficiency between the engines 36A, 36B and the respective propellers 20A, 20B when compared to a series arrangement, since the series configuration requires energy conversion.

The propulsion system 10 further includes a first battery pack 72A, a second battery pack 72B, one or more first inverters 74A, and one or more second inverters 74B. The first battery pack 72A is electrically coupled to the first motor 38A and another system within the aircraft 12 such as, for example, an environmental control system (ECS) 76. The second battery pack 72B is electrically coupled to the second motor 38B and yet another system within the aircraft 12 such as, for example, a hydraulic system 78.

The first battery pack 72A and the second battery pack 72B both include a plurality of individual batteries 80 that are rechargeable as shown in FIG. 3. For example, the individual batteries 80 may be lithium ion batteries. The first battery pack 72A provides electrical power to the first motor 38A when the first motor 38A operates in the power mode. Specifically, the first battery pack 72A creates DC current that is converted into alternating current (AC) by the first inverters 74A. It is to be appreciated that the first battery pack 72A and the second battery pack 72B are both sized for takeoff assist to the respective engines 36A, 36B. Accordingly, in one alternative embodiment the first battery pack 72A and the second battery pack 72B provide the power to the propellers 20A, 20B during climb and the first engine 36A and the second engine 36B are not operating during climb. This approach may be used to reduce emissions or reduce noise nearby an airport.

The first motor 38A operates as a generator to charge the first battery pack 72A when operating in the regeneration mode, such as during the cruise phase of flight. Recharging the first battery pack 72A during the cruise phase of flight provides various benefits. Specifically, when the first battery pack 72A is charged during the cruise phase of flight, the aircraft 12 does not require re-charging after landing. The second battery pack 72B is also charged by the second motor 38B when operating in the regeneration mode, such as during the cruise phase of flight.

Figure 3A:
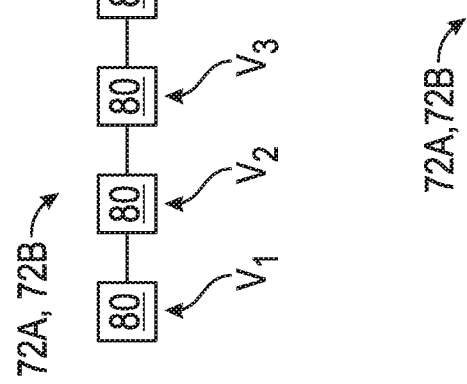
FIG. 3A is schematic diagram of a first arrangement of individual batteries that are part of a battery pack shown in FIG. 2, according to an exemplary embodiment.
Figure 3B:
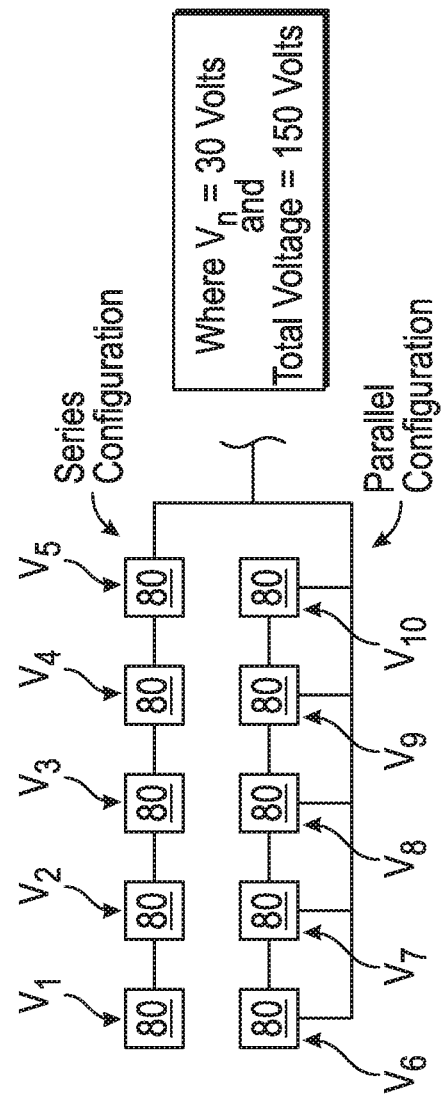
FIG. 3B is schematic diagram of a second arrangement of the individual batteries that are part of the battery pack, according to an exemplary embodiment.

FIGS. 3A and 3B illustrate an exemplary approach for switching an arrangement of the battery packs 72A, 72B when the motors 38A, 38B operate in the regeneration mode, such as during the cruise phase of flight. It is to be appreciated that in the exemplary embodiment, the voltage generated by each battery pack 72A, 72B may be reduced by approximately fifty percent once the aircraft 12 finishes the climb phase of flight when compared to the voltage of the battery packs 72A, 72B at the beginning of the climb phase of flight. It is also to be appreciated that the voltage generated by the motors 38A, 38B during the regeneration mode is greater than the voltage generated by each battery pack 72A, 72B, to enable successful charging during flight and to also enable the motors 38A and 38B to provide power to operate the tail cone fan 30 as described in more detail below. Therefore, the arrangement of individual batteries 80 of the battery packs 72A, 72B is changed between the power mode, where the battery packs 72A, 72B provide power, and the regeneration mode, where the battery packs 72A, 72B are re-charged. The first battery pack 72A and the second battery pack 72B both include a plurality of individual batteries 80 that are recharged during the regeneration mode.

FIG. 3A is an exemplary arrangement of the individual batteries 80 during climb. In the embodiment as shown in FIG. 1, the plurality of individual batteries 80 are connected to one another in a first arrangement, which may also be referred to as a series arrangement, during the power mode. FIG. 3B is an exemplary arrangement of the individual batteries 80 during the power mode. In the embodiment as shown in FIG. 3B, the plurality of individual batteries 80 are connected to one another in a second arrangement, which may also be referred to as a combination series and parallel arrangement, during the regeneration mode.

In the non-limiting embodiment as shown, each battery pack 72A, 72B includes ten individual batteries 80 that each produce an individual voltage $V_n$, however, it is to be appreciated that any number of individual batteries 80 may be used. In the embodiment as shown in FIG. 3A, the plurality individual batteries 80 are each arranged in a series configuration to maximize voltage. In contrast, the arrangement of individual batteries 80 in FIG. 3B reduces the voltage to a value that is less than the voltage produced by the motors 38A, 38B (FIGS. 1 and 2) during the regeneration mode.

Referring specifically to FIG. 3A, the voltage produced by each battery pack 72A, 72B is determined by adding the individual voltage $V_n$ produced by each individual battery 80 together. For example, if each individual battery 80 produced 30 Volts at 20% state of charge as the aircraft 12 finishes the climb phase of flight (i.e., $V_n$=30 Volts), then the voltage produced by each battery pack 72A, 72B is 300 Volts. However, if the voltage produced by each motor 38A, 38B during the regeneration mode is only 280 Volts, then the motors 38A, 38B are unable to provide charge. Accordingly, as seen in FIG. 3B, half of the individual batteries 80 are arranged in a series configuration and the remaining half of the individual batteries 80 are arranged in a parallel configuration. The individual batteries 80 arranged in a series configuration are placed in parallel with the individual batteries arranged in the parallel configuration, which results in an overall voltage of 150 Volts.

Referring back to FIG. 1, the tail cone fan 30 is disposed along a fore end 90 of the nacelle 16 and includes a plurality of rotating blades (not visible) that create airflow. An electric motor 56 is disposed within the tail cone fan 30 and is powered by the first motor 38A and the second motor 38B when the aircraft 12 is operating in the cruise phase of flight, where both motors 38A, 38B are operating in the regeneration mode and are being driven by the respective engines 36A, 36B. It is to be appreciated that the tail cone fan 30 also provides propulsive power to the aircraft 12. Specifically, the tail cone fan 30 provides propulsive power for two reasons. First, the tail cone fan 30 reduces ram air drag around the nacelle 16. Specifically, ram air is passed through the nacelle 16 and out of the tail cone fan 30, where a ram air flow R is shown in FIG. 1. Second, the tail cone fan 30 boosts or increases the mass of outside air A that is introduced into the respective combustion air inlets 94A, 94B of the turbochargers 42A, 42B. The tail cone fan 30 also improves thrust by ingesting boundary air around the nacelle 16. It is to be appreciated that boundary air increases drag.

The first turbocharger 42A is fluidly connected to a first air intake 96A of the first engine 36A and the second turbocharger 42B is fluidly connected to a second air intake 96B of the second engine 36B. The turbocharges 42A, 42B compress the outside air A. The compressed outside air A is then provided to the air intakes 96A, 96B of the respective engine 36A, 36B. The turbochargers 42A, 42B may improve the efficiency of an internal combustion engine by forcing more outside air A into the respective internal combustion engines 36A, 36B. The tail cone fan 30 further increases the outside air A that is forced over the engines 36A, 36B.

The exhaust system 28 includes a first exhaust conduit 98A fluidly connected to an exit manifold 100A of the first engine 36A. The exhaust system 28 further includes a second exhaust conduit 98B fluidly connected to an exit manifold 100B of the second engine 36B. Exhaust gases G that exit the first engine 36A and the second engine 36B travel within their respective exhaust conduits 98A, 98B and towards the fore end 90 of the nacelle 16, and toward the tail cone fan 30. The tail cone fan 30 is fluidly connected to receive exhaust gases from the first exhaust conduit 98A and the second exhaust conduit 98B, and is driven by the exhaust gases during all flight phases, except for cruise.

In an embodiment, the first hybrid propulsion system 22A further includes a first air-oil heat exchanger 110A. Likewise, the second hybrid propulsion system 22B includes an air-oil heat exchanger 110B. The first air-oil heat exchanger 110A is fluidly connected to an air intake 112A disposed along an aft end 92 of the nacelle 16, and the second air-oil heat exchanger is fluidly connected to an air intake 112B also disposed along the aft end 92 of the nacelle 16. The air-oil heat exchangers 110A, 110B are configured to provide cooling to the respective engines 36A, 36B. In addition to cooling the engines 36A, 36B, the air-oil heat exchangers 110A, 110B also provide heated air to the respective exhaust conduits 98A, 98B and also extract thermal energy from the fuel used to power the engines 36A, 36B.

It is to be appreciated that in the exemplary embodiment the engines 36A, 36B operate at a rotational speed of approximately 2000 RPM. Furthermore, it is also to be appreciated that the rotational speed of the propellers 20A, 20B also operate at the same rotational speed as the engines 36A, 36B. Accordingly, it is to be appreciated that the rotational speed of the first engine 36A controls the rotational speed of the first propeller 20A and the rotational speed of the second engine 36B controls the rotational speed of the second propeller 20B. Thus, it is also to be appreciated that unlike some hybrid propulsion systems that require a planetary gearset to decouple the rotational speed of the engine and the output, the disclosed propulsion system 10 only require gearboxes 48A, 48B, 50A, 50B for accommodating the geometry or packaging layout of the propellers 20A, 20B.

Figure 4:
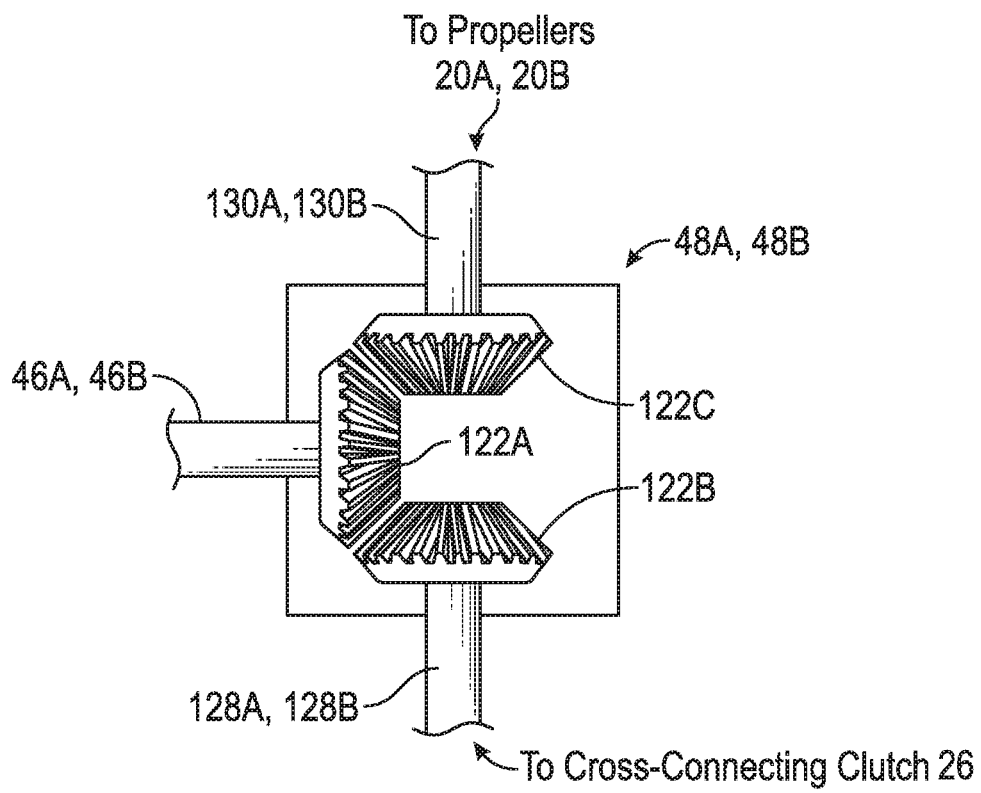
FIG. 4 is an enlarged view of a final drive gearbox shown in FIG. 1, according to an exemplary embodiment.

FIG. 4 is an enlarged view of one or the final drive gearboxes 48A, 48B. Referring to FIGS. 1 and 4, the first final drive gearbox 48A and the second final drive gearbox 48B both include three bevel gears 122A, 122B, 122C. It is to be appreciated that bevel gears transmit motion between two shafts that are not aligned with one another. Moreover, the bevel gears 122A, 122B, 122C are meshingly engaged with one another at a 1:1 ratio to drive the propellers 20A, 20B at the same rotational speed as the engines 36A, 36B. A driving beveled gear 122A is driven by the output 46A, 46B of either the first motor 38A or the second motor 38B.

The driving beveled gear 122A is meshed with the remaining two driven beveled gears 122B, 122C. The driven bevel gear 122B drives the cross-connecting clutch 26 through a shaft 128A, 128B. The driven bevel gear 122C drives a respective propeller 20A, 20B thought a connecting shaft 130A, 130B.

Referring back to FIG. 1, the gearboxes 50A, 50B also include bevel gears 132A, 132B for transmitting motion between the connecting shafts 130A, 130B and a corresponding propeller shafts 140A, 140B. It is to be appreciated that the connecting shafts 130A, 130B are arranged perpendicular with respect to their corresponding propeller shaft 140A, 140B. A driving bevel gear 132A is driven by the respective connecting shaft 130A, 130B. A driven bevel gear 132B is driven by the driving bevel gear 132A, where the driven bevel gear 132B is connected to the respective propeller shaft 140A, 140B.

Figure 5A:
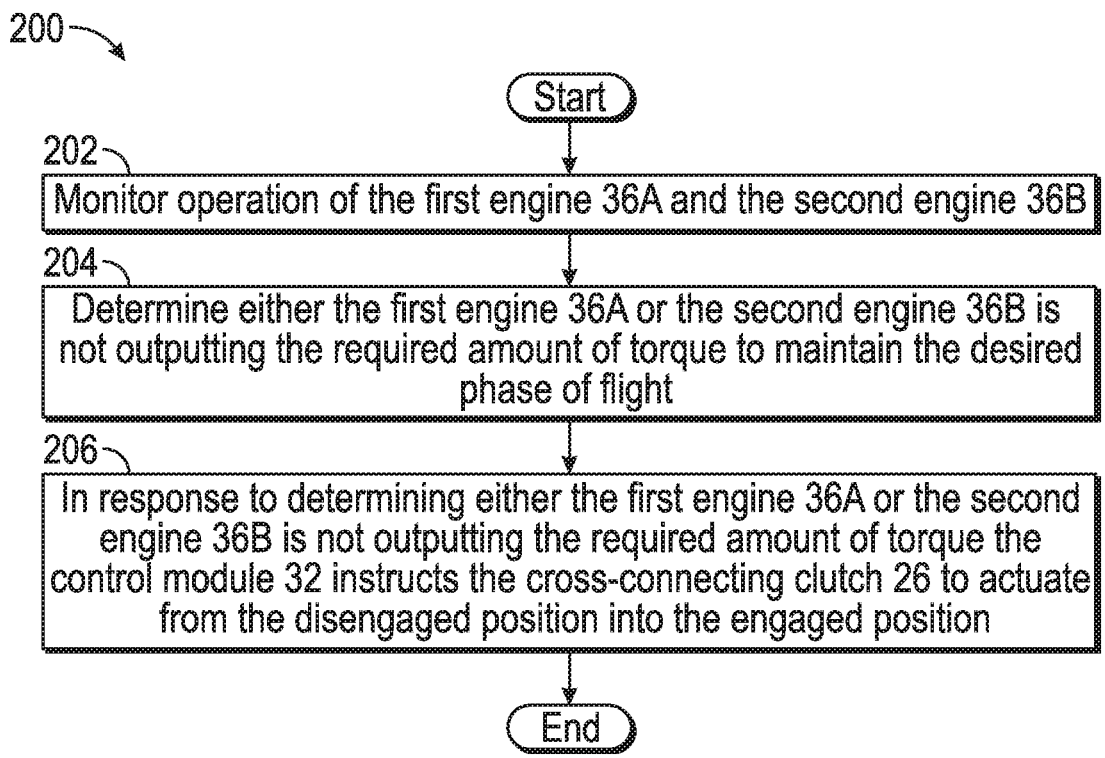
FIGS. 5A and 5B are process flow diagrams illustrating methods of operating the disclosed propulsion system, according to an exemplary embodiment.
Figure 5B:
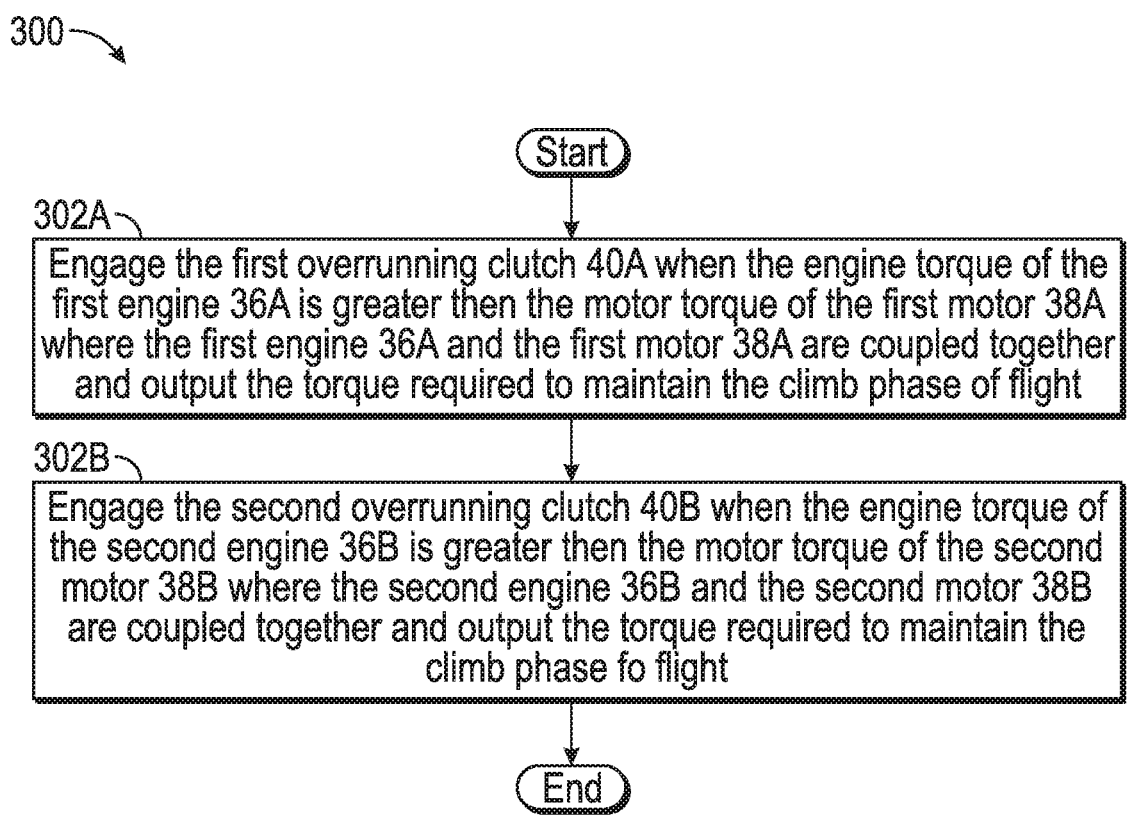

Referring now to FIGS. 5A and 5B, exemplary process flow diagrams illustrating methods 200 and 300 of operating the propulsion system 10 for the aircraft 12. Specifically, method 200 shown in FIG. 5A illustrates operation of the cross-connecting clutch 26, and FIG. 5B illustrates operation of the overrunning clutches 40A, 40B. Referring now to FIGS. 1 and 5A, the method 200 begins at block 202. In block 202, the control module 32 monitors operation of the first engine 36A and the second engine 36B, where the first engine 36A is part of the first hybrid propulsion system 22A that is operably coupled to the first propeller 20A, and the second engine 36B is part of the second hybrid propulsion system 22A operably coupled to the second propeller 20B. The method 200 then proceeds to block 204.

In block 204, the control module 32 determines either the first engine 36A or the second engine 36B is not outputting the required amount of torque to maintain the desired phase of flight. As mentioned above, the first hybrid propulsion system 22A includes the first motor 38A coupled to the first engine 36A by the first overrunning clutch 40A, and the second hybrid propulsion system 22B includes the second motor 38B coupled to the second engine 36B by a second overrunning clutch 40B. The method 200 then proceeds to block 206.

In block 206, in response to determining either the first engine 36A or the second engine 36B is not outputting the required amount of torque, the control module 32 instructs the cross-connecting clutch 26 to actuate from the disengaged position into the engaged position. Accordingly, engaging the cross-connecting clutch 26 results in the first hybrid propulsion system 22A driving the second propeller 20B when the second engine 36A does not output the required torque to maintain the desired phase of flight of the aircraft 12. Similarly, engaging the cross-connecting clutch 26 results in the second hybrid propulsion system 22B driving the first propeller 20A when the first engine 36A does not output the required torque to maintain the desired phase of flight of the aircraft 12. The method 200 then terminates.

Referring now to FIGS. 1 and 5B, the method 300 begins at blocks 302A and 302B. It is to be appreciated that blocks 302A and 302B are performed simultaneously. In block 302A, the first overrunning clutch 40A is engaged when the engine torque of the first engine 36A is greater than the motor torque of the first motor 38A, such as when the first engine 36A is started. Thus, during normal operation, the first engine 36A and the first motor 38A are coupled together by the overrunning clutch 40A during all phases of flight of the aircraft 12. Similarly, in block 302B, the second overrunning clutch 40B is engaged when the engine torque of the second engine 36B is greater than the motor torque of the second motor 38B, such as when the second engine 36B is started. Therefore, the second engine 36B and the second motor 38B are also coupled together by the second overrunning clutch 40B during all phases of flight of the aircraft 12.

As mentioned above, because the respective engine 36A, 36B and motor 38A, 38B are coupled together by the respective overrunning clutch 40A, 40B during all phases of flight, the additional torque generated by the motors 38A, 38B during the climb phase of flight enables the engines 36A, 36B to be sized specifically for the cruise phase of flight when the additional torque provided by the motors 38A, 38B is not required. This results in a smaller, lighter engine when compared to conventional engines that are typically sized for the climb phase of flight.

Referring generally to the figures, the disclosed propulsion system provides various technical effects and advantages. Specifically, the cross-connecting clutch is engaged when one of the two engines do not generate the torque required to maintain a desired phase of flight. Therefore, in the event one of the two hybrid propulsion systems become inoperable, both propellers may still be driven. Moreover, this may also reduce maintenance costs associated with the engines. Moreover, when the engine torque is greater than the motor torque, such as when the aircraft is in the climb phase of flight, the overrunning clutches are engaged to couple the engine and motor to one another. As a result, the engine may be smaller and less expensive than other conventional engines that are sized to provide all of the power required when the aircraft is operating in the climb phase of flight. It is also to be appreciated that an internal combustion engine provides improved efficiency, which may be especially advantageous if the propeller-driven aircraft is used frequently. Finally, since the battery packs are charged during the cruise portion of flight, then the batteries re-charged as the aircraft lands. Accordingly, the aircraft does not need re-charging after completing the flight.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A propulsion system for an aircraft, the propulsion system comprising:
   a first propeller and a second propeller;
   a first hybrid propulsion system including a first motor coupled to a first engine by a first overrunning clutch, wherein the first hybrid propulsion system is operably coupled to drive the first propeller;
   a second hybrid propulsion system including a second motor coupled to a second engine by a second overrunning clutch, wherein the second hybrid propulsion system is operably coupled to drive the second propeller;
   a cross-connecting clutch operably coupled to both the first hybrid propulsion system and the second hybrid propulsion system and configured to actuate into an engaged position; and
   a first battery pack electrically coupled to the first motor and a second battery pack electrically coupled to the second motor, wherein the first battery pack and the second battery pack both include a plurality of individual batteries that are recharged during a cruise phase of flight, and wherein the plurality of individual batteries are connected to one another in a first arrangement during a climb phase of flight and in a second arrangement during the cruise phase of flight.

2. The propulsion system of claim 1, wherein the first overrunning clutch is engaged when an engine torque of the first engine is greater than a motor torque of the first motor, and wherein the second overrunning clutch is engaged when the engine torque of the second engine is greater than the motor torque of the second motor.

3. The propulsion system of claim 1, wherein the first motor and the second motor operate in a power mode of operation during a climb phase of flight of the aircraft and a regeneration mode during a cruise phase of flight of the aircraft.

4. The propulsion system of claim 1, wherein the first overrunning clutch is disengaged when an engine torque of the first engine is zero, and wherein the second overrunning clutch is disengaged when the engine torque of the second engine is zero.

5. The propulsion system of claim 1, wherein the first engine and the first motor are coupled together by the first overrunning clutch in all phases of flight, and the second engine and the second motor are coupled together by the second overrunning clutch in all phases of flight.

6. The propulsion system of claim 1, wherein a rotational speed of the first engine controls the rotational speed of the first propeller and a rotational speed of the second engine controls the rotational speed of the second propeller.

7. The propulsion system of claim 1, wherein the first engine and the second engine are compression ignition engines.

8. The propulsion system of claim 1, further comprising a first turbocharger fluidly connected to a first air intake of the first engine and a second turbocharger fluidly connected to a second air intake of the second engine.

9. The propulsion system of claim 1, wherein the first hybrid propulsion system and the second hybrid propulsion system are arranged in a parallel configuration.

10. The propulsion system of claim 1, wherein the first arrangement is series arrangement and the second arrangement is a combination series and parallel arrangement.

11. The propulsion system of claim 1, further comprising a first exhaust conduit fluidly connected to the first engine and a second exhaust conduit fluidly connected to the second engine.

12. The propulsion system of claim 11, further comprising a tail cone fan fluidly connected to receive exhaust gases from the first exhaust conduit and the second exhaust conduit.

13. The propulsion system of claim 1, further comprising a control module in electronic communication with the cross-connecting clutch, wherein the control module instructs the cross-connecting clutch to actuate into the engaged position.

14. The propulsion system of claim 13, wherein the control module executes instructions to:
determine either the first engine or the second engine is not outputting a required amount of torque required to maintain a desired phase of flight; and
in response to determining either the first engine or the second engine is not outputting the required amount of torque, instruct the cross-connecting clutch to actuate from a disengaged position into the engaged position.

15. A method of operating a propulsion system for an aircraft, the method comprising:
monitoring, by a control module, operation of a first engine and a second engine, wherein the first engine is part of a first hybrid propulsion system that is operably coupled to a first propeller and the second engine is part of a second hybrid propulsion system operably coupled to a second propeller;
determining, by the control module, either the first engine or the second engine is not outputting a required amount of torque to maintain a desired phase of flight, wherein the first hybrid propulsion system includes a first motor coupled to the first engine by a first overrunning clutch and the second hybrid propulsion system includes a second motor coupled to the second engine by a second overrunning clutch;
in response to determining either the first engine or the second engine is not outputting the required amount of torque, instruct a cross-connecting clutch to actuate from a disengaged position into an engaged position; and
connecting a plurality of first individual batteries that are part of a first battery pack and a plurality of second individual batteries that are part of a second battery pack to one another in a first arrangement during a climb phase of flight and in a second arrangement during a cruise phase of flight.

16. The method of claim 15, further comprising:
engaging the first overrunning clutch when an engine torque of the first engine is greater than a motor torque of the first motor.

17. The method of claim 16, further comprising:
engaging the second overrunning clutch when the engine torque of the second engine is greater than the motor torque of the second motor.

18. An aircraft, comprising:
a nacelle;
a first propeller and a second propeller attached to and located on opposing sides of the nacelle;
a first hybrid propulsion system including a first motor coupled to a first engine by a first overrunning clutch, wherein the first hybrid propulsion system is operably coupled to drive the first propeller;
a second hybrid propulsion system including a second motor coupled to a second engine by a second overrunning clutch, wherein the second hybrid propulsion system is operably coupled to drive the second propeller;
a cross-connecting clutch operably coupled to both the first hybrid propulsion system and the second hybrid propulsion system and configured to actuate into an engaged position, wherein engaging the cross-connecting clutch results in the first hybrid propulsion system driving the second propeller when the second engine does not output a required torque to maintain a desired phase of flight of the aircraft, and wherein engaging the cross-connecting clutch results in the second hybrid propulsion system driving the first propeller when the first engine does not output the required torque to maintain the desired phase of flight of the aircraft; and
a first battery pack electrically coupled to the first motor and a second battery pack electrically coupled to the second motor, wherein the first battery pack and the second battery pack both include a plurality of individual batteries that are recharged during a cruise phase of flight, and wherein the plurality of individual batteries are connected to one another in a first arrangement during a climb phase of flight and in a second arrangement during the cruise phase of flight.

19. A propulsion system for an aircraft, the propulsion system comprising:

a first propeller and a second propeller;
a first hybrid propulsion system including a first motor coupled to a first engine by a first overrunning clutch, wherein the first hybrid propulsion system is operably coupled to drive the first propeller;
a second hybrid propulsion system including a second motor coupled to a second engine by a second overrunning clutch, wherein the second hybrid propulsion system is operably coupled to drive the second propeller;
a cross-connecting clutch operably coupled to both the first hybrid propulsion system and the second hybrid propulsion system and configured to actuate into an engaged position; and
a first turbocharger fluidly connected to a first air intake of the first engine and a second turbocharger fluidly connected to a second air intake of the second engine.

20. A propulsion system for an aircraft, the propulsion system comprising:

a first propeller and a second propeller;
a first hybrid propulsion system including a first motor coupled to a first engine by a first overrunning clutch, wherein the first hybrid propulsion system is operably coupled to drive the first propeller;
a second hybrid propulsion system including a second motor coupled to a second engine by a second overrunning clutch, wherein the second hybrid propulsion system is operably coupled to drive the second propeller;
a cross-connecting clutch operably coupled to both the first hybrid propulsion system and the second hybrid propulsion system and configured to actuate into an engaged position; and
a tail cone fan fluidly connected to receive exhaust gases from a first exhaust conduit fluidly coupled to the first engine and a second exhaust conduit fluidly coupled to the second engine.

\* \* \* \* \*